United States Patent [19]

Castricum

[11] Patent Number: 4,823,579

[45] Date of Patent: Apr. 25, 1989

[54] APPARATUS FOR CUTTING HOLLOW PIPES

[75] Inventor: Wilhelmus P. Castricum, Rolling Meadows, Ill.

[73] Assignee: Spiro America Inc., Wheeling, Ill.

[21] Appl. No.: 127,744

[22] Filed: Dec. 2, 1987

[51] Int. Cl.[4] .............................................. B21C 37/12
[52] U.S. Cl. ........................................ 72/49; 72/132; 82/53.1; 82/82
[58] Field of Search ...................... 72/49, 50, 129, 132, 72/135; 82/53.1, 54, 56, 82, 98, 101, 102; 83/188, 192, 318, 319; 228/17.7, 145, 146, 147

[56] References Cited

U.S. PATENT DOCUMENTS

| | | | |
|---|---|---|---|
| 694,524 | 3/1902 | Boyd | 82/58 |
| 957,966 | 5/1910 | Jenkins | 82/94 |
| 3,132,616 | 5/1964 | Hale | 72/148 |
| 3,913,430 | 10/1975 | Van Dijk | 82/82 |
| 4,054,069 | 10/1977 | Coop | 82/53.1 X |
| 4,567,742 | 2/1986 | Castricum | 72/50 |
| 4,706,481 | 11/1987 | Castricum | 72/49 |
| 4,744,276 | 5/1988 | Duce | 83/188 X |

FOREIGN PATENT DOCUMENTS 1215914  3/1986  U.S.S.R. .................. 83/188

Primary Examiner—E. Michael Combs
Attorney, Agent, or Firm—Willian Brinks Olds Hofer Gilson & Lione Ltd.

[57] ABSTRACT

An apparatus for cutting spirally formed pipe is disclosed. This apparatus has two knives mounted on a boom to be positioned inside of the pipe. The inner knives have cutting edges that are adjacent the inner pipe surface and point in opposite directions. Two knives are also positioned outside of the pipe. Each outer knife is positioned opposite of one of the inner knives. The outer knives are continuously reciprocated toward and away from their respective opposed inner knife. The reciprocating outer knives are maintained in a position clear of the pipe while the spiral pipe is formed. The reciprocating outer knives are moved to a cutting position where their cutting edges move into and out of an overlapping relationship with the cutting edges of their respective inner knives to cut the pipe. The inner knives and reciprocating outer knives are connected to an axial motion pneumatic cylinder and a sliding guide shaft system that allow the knives to move in the axial direction of the axially moving pipe during the cutting process. The inner and outer knives are thus adapted to cooperate to rectangularly cut a spirally moving pipe into sections.

18 Claims, 8 Drawing Sheets

APPARATUS FOR CUTTING HOLLOW PIPES

BACKGROUND OF THE INVENTION

This invention relates to an apparatus for cutting hollow pipes, particularly spirally formed, hollow metal pipes.

Hollow metal pipes are widely used for ventilation ducts. These pipes are formed from a continuous strip of thin metal. My U.S. Pat. No. 4,567,742, issued Feb. 4, 1986, describes a preferred machine for making triple-ribbed, spiral seam pipe. U.S. Pat. No. 3,132,616 (Hale) describes another type of machine for making corrugated, spiral seamed pipe. Both types of machine start with a flat strip of metal. The strip passes through a series of rollers which bend the edges into predetermined shapes, and form parallel corrugations or reinforcing ribs in the strip. The strip then passes around the inner surface of a forming head (a mandrel) in a spiral manner, so that the strip takes a spiral shape with opposite edges of the strip meshing. The intermeshed edges of the strip are then compressed to form the pipe with a spiral lockseam. The strip is continuously fed into the machine to continuously produce spiral seamed pipe. The spirally formed pipe moves away from the forming head in the axial direction of the pipe and rotates.

At some point the pipe will reach its desired length and must be cut. The assignee of this invention in the past used a rotary saw for cutting the pipe. The saw is mounted on or near the machine, outside the pipe, where it does not interfere with the pipe forming process. When the pipe is ready to be cut, it stops moving. The saw blade is then moved into its cutting position and penetrates the pipe. The metal strip material and pipe forming operation then begin again at a slow speed. This causes the pipe to move forward and rotate. The saw is adapted to move with the pipe for one complete rotation, whereupon the pipe is completely severed. The saw is then returned to its starting position clear of the tube, and the cut pipe section is discharged onto a run-off table. The tube forming process is then repeated to produce another section of pipe.

Hale also discloses a saw blade disposed outside of a spiral seamed, hollow pipe for cutting the pipe into sections.

There are several disadvantages to using high speed saws to cut metal pipes. First, the saw blade, which rotates as fast as 5000 RPM, is dangerous to the machine operator and anyone near the machine. Second, the saw generates a lot of sparks when it cuts the metal, which also creates a hazardous situation. Anyone near the machine must wear safety glasses to protect himself from the sparks. Third, the saw cut leaves burrs on the edge of the pipe. These burrs must be filed off by someone, who must be careful not to cut himself on the burrs. Finally, the cutting operation is very noisy.

My U.S. Pat. No. 4,706,481 discloses a cutting apparatus for hollow metal pipes that overcomes the disadvantages of high speed saw blades. In this apparatus, a first rotatable cutting blade is to be positioned inside a hollow metal pipe. A second rotatable cutting blade is positioned outside of the pipe. The second blade is moved towards the first blade so that the blades overlap to puncture the pipe surface. The blades are adapted to move together in the direction of the pipe, so that they will cut the pipe perpendicularly to the pipe axis as the pipe moves forward and rotates between the overlapping edges of the blades.

The pipe cutting apparatus disclosed in U.S. Pat. No. 4,706,481 uses a slitter-type shearing action, like scissors, to cut the pipe. The pipe is cut without the sparks, noise and danger of a high-speed saw blade. Thus, this apparatus provides a safer environment for manufacturing spiral seamed pipes. Further, this type of cutting apparatus does not leave burrs on the ends of the cut pipe sections. This increases the efficiency of the pipe forming process because manpower does not have to be utilized to de-burr the cut pipes. Still further, this pipe cutting apparatus may be easily adapted to existing spiral pipe producing machines.

Notwithstanding all of its advantages, it has been found that the pipe cutting apparatus disclosed in U.S. Pat. No. 4,706,481 has some limitations. The most notable limitation is that difficulties arise in attempting to cut pipes smaller than two inches in diameter. In this cutting apparatus, an inner rotatable knife and a boom carrying that knife must fit inside the pipe. It has been found that when the boom diameter becomes too small it is difficult to keep the boom rigid during the cutting process. If the boom is not kept rigid, the inner knife may lose its overlapping, slitting relationship with the outer knife. As a result, the pipe may not be completely cut, or the cut may be irregular or have jagged portions.

SUMMARY OF THE INVENTION

The present invention is directed to a new type of apparatus for cutting spirally formed pipes. The present invention is intended to retain many of the same advantages over high speed saw blades as the pipe cutting apparatus disclosed in U.S. Pat. No. 4,706,481, but also to be better suited for cutting smaller diameter pipes.

According to this invention, a first knife blade is to be positioned inside of a spirally formed pipe. A second knife blade is positioned outside the pipe. The second knife blade is reciprocated into and out of an overlapping relationship with the first knife blade. The first and second knife blades are arranged to move in the axial direction of the pipe, so that the first and second knives cooperate to cut the pipe when the second knife blade reciprocates and overlaps the first knife blade and the pipe moves axially and rotates between the first and second knives.

In a preferred embodiment, the invention includes two knife blades mounted on a boom to be positioned inside the pipe, with the cutting edges of the inner knives pointing in opposite directions. Two knife blades are positioned outside the pipe. The cutting edge of each outer knife blade is positioned opposite the cutting edge of an inner knife blade, and is reciprocated in a direction toward its opposed inner knife blade. When the pipe has reached its desired length, the outer knife blades are moved to their cutting positions, where their cutting edges reciprocate into and out of an overlapping relationship with the cutting edges of their respective opposed inner knife blades. The four knife blades are arranged so that in the cutting position they will move in the axial direction of the pipe, and cooperate to cut the pipe when the cutting edges of the outer knife blades reciprocate and overlap with the cutting edges of their respective opposed inner knife blades and the pipe moves axially and rotates between the inner and outer knives.

In the preferred embodiment of the invention, the outer knife blades can be controlled so that they reciprocate 180 degrees out of phase. Moreover, the positioning of the inner and outer knives relative to each other can be adjusted in several ways to assure that a proper orientation between the cutting edges of the knife blades is maintained.

The invention itself, together with further objects and attendant advantages, will best be understood by reference to the following detailed description taken in conjunction with the drawings.

DETAILED DESCRIPTION OF A PREFERRED EMBODIMENT

Figure 7:
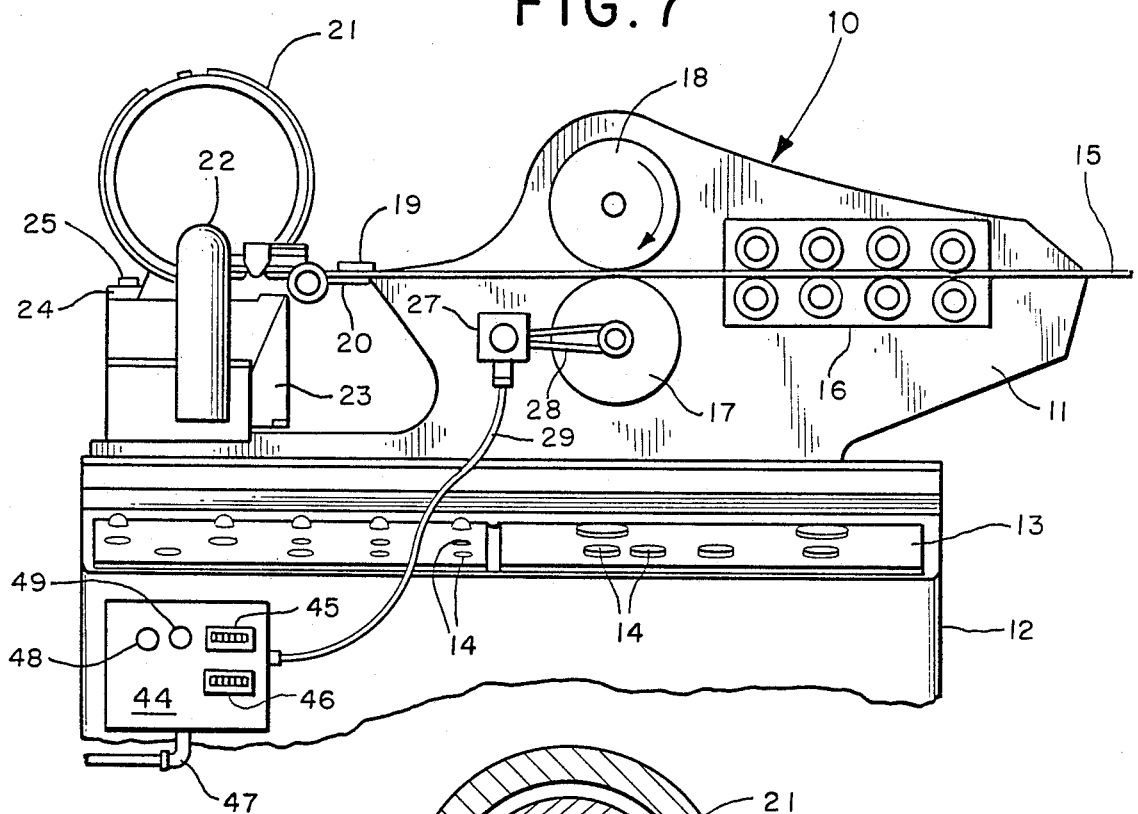
FIG. 7 is a side elevation view of a spiral pipe forming machine with which a preferred embodiment of the present invention can be used.

Referring now to the drawings, FIGS. 1-6 show a pipe cutting apparatus 50 embodying the present invention which is used with a spiral pipe forming machine 10. Some elements of the pipe forming machine 10 are shown with elements of the pipe cutting apparatus in FIGS. 1-6. The pipe forming apparatus 10 is shown in greater detail in FIGS. 7 and 8. The spiral pipe producing machine 10 shown in FIGS. 1-8 herein is briefly described below. A more detailed explanation of spiral pipe producing machines that may be used with the present invention can be found in my U.S. Pat. No. 4,567,742 (see FIGS. 1, 2, 6 and 7) and U.S. Pat. No. 3,132,616 (Hale). These patents are incorporated by reference herein and made a part hereof for their descriptions of spiral pipe producing machines. It should be understood, however, that the present invention is intended to be used with any type of spiral pipe producing machine, not just those shown in the foregoing patents.

The spiral pipe producing machine 10 continuously produces spiral seamed pipe 42 from a continuous strip of metal 15. This machine includes a frame 11 and a control cabinet 12. A plurality of control knobs, gauges and dials 14 are located on the control panel 13 for controlling and monitoring the operation of the machine 10 and a slitter-type of pipe cutting apparatus that is disclosed in my U.S. Pat. No. 4,706,481. The functions of the various control switches are described in detail in that patent. The controls for the slitter apparatus are not used with the pipe cutting apparatus 50. However, since the same pipe forming machine 10 is presently intended to be used with both a slitter apparatus and a pipe cutting apparatus 50 (although not at the same time), the controls 14 are left on the pipe forming machine 10.

A roller housing 16 is mounted in the frame 11. The roller housing contains a plurality of rollers which bend the edges of the metal strip 15 in predetermined shapes for forming a lockseam, and which may form corrugation grooves in the metal strip. An upper drive roller 18 and a lower drive roller 17 are rotatably mounted within the frame 11 adjacent the roller housing 16. The upper drive roller 18 pulls the continuous metal strip 15 into the frame 11, through the roller housing 16, and over the lower drive roller 17. The drive rollers then cooperate to push the metal strip 15 between the upper guide plates 19 and the lower guide plates 20 into the forming head 21.

The forming head 21 curls the metal strip in a helical manner so that the outer pre-formed edges of the strip 15 are adjacent each other and mesh. The helically curled strip thus takes the shape of a spiral cylinder. The adjacent, mated edges of the strip are then compressed between a support roller 32 and a clinching roller 34 to form a lockseam 43. The metal strip 15 is continuously pushed by the drive rollers 17, 18 through the forming head 21 and between the clinching roller 34 and support roller 32, in a spiral manner, so that a spiral pipe 42 is continuously produced with a spiral lockseam 43.

The support roller 32 is mounted on the upper guide plate 19. A support arm 22 pushes down on the support roller 32 and holds it in place. The clinching roller 34 is moved into and out of its clinching position by a conventional hydraulic cylinder assembly 35, which operates in a known manner. The cylinder assembly 35 includes a yoke 36 which holds the clinching roller 34. The yoke 36 is appended to a piston rod 37, which slides in and out of a cylinder head 38. The cylinder head 38 is attached to the cylinder barrel 39 by bolts 40. The hydraulic cylinder assembly 35 provides the pressure on the clinching roller 34 to close the lockseam 43.

The forming head 21 is secured to the forming head base 23 by the key 24 and bolts 25. The key 24 allows the forming head 21 to be easily removed. Different size forming heads can be used with the same spiral pipe producing machine 10 to produce spiral pipe of various diameters. The forming head base 23 presently used with cutting apparatus 50 is smaller than the forming head base used with the slitter-type cutter disclosed in U.S. Pat. No. 4,706,481, because the cutting apparatus 50 is presently used with smaller diameter pipes, which require smaller forming heads. Accordingly, the forming head base 23 disclosed herein uses less material.

Figure 1:
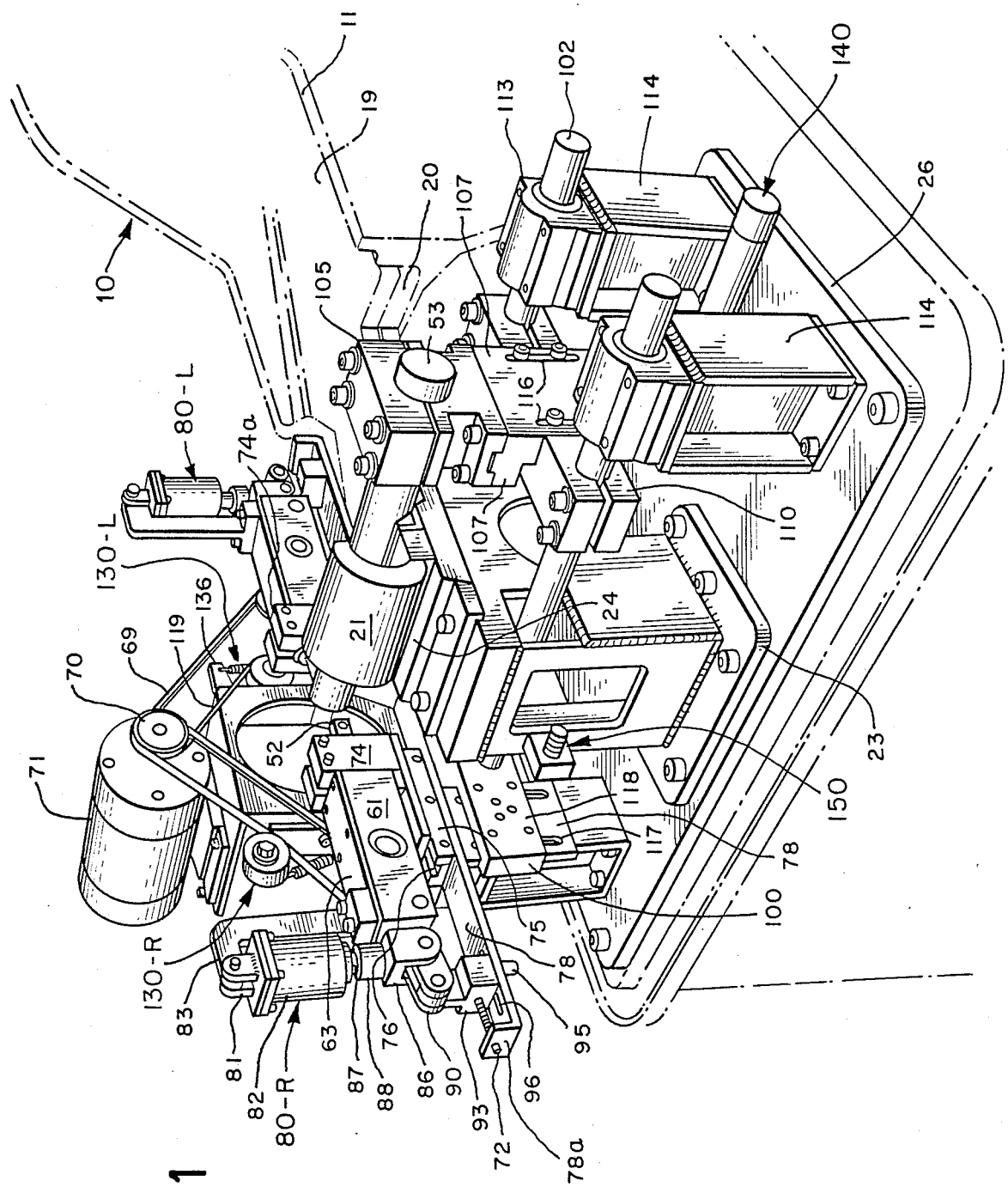
FIG. 1 is a rear perspective view of a preferred embodiment of the present invention.
Figure 3:
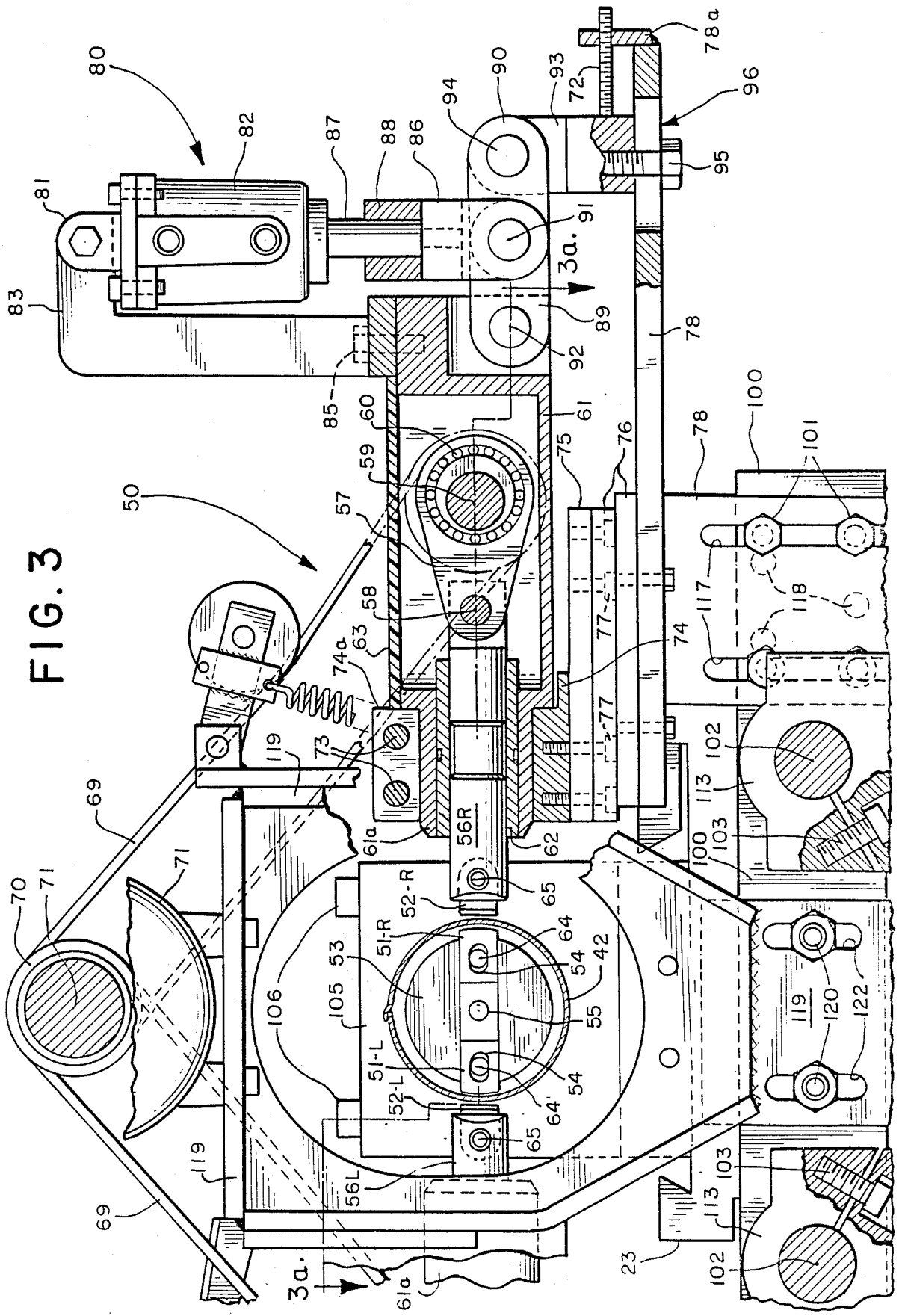
FIG. 3 is an enlarged partial view of FIG. 2, with some parts shown in section.
Figure 3A:
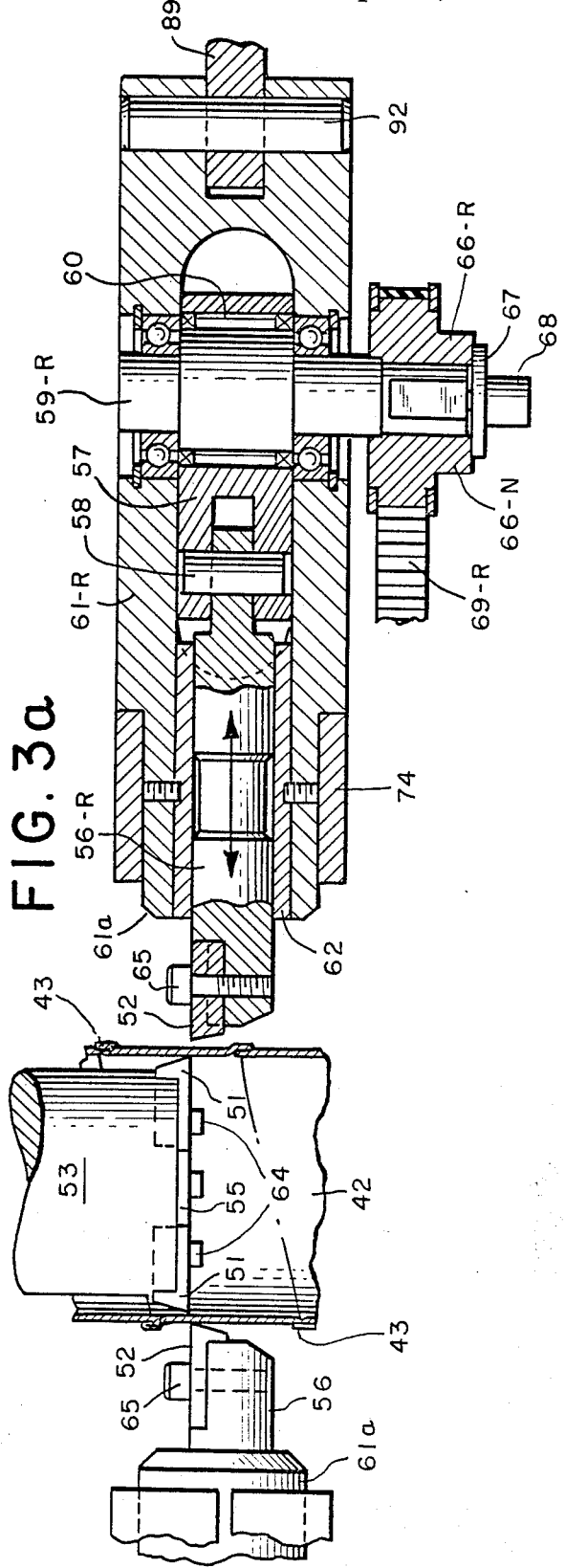
FIG. 3a is a sectional view taken along lines 3a—3a of FIG. 3.
Figure 3B:
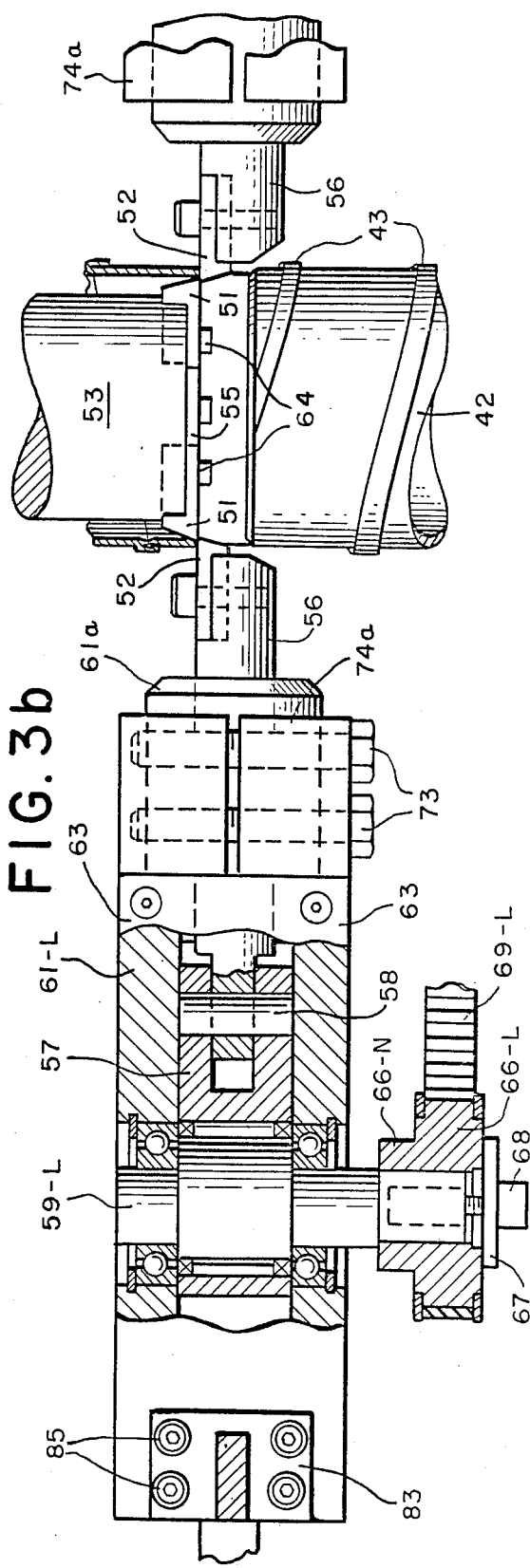
FIG. 3b is a sectional view taken along lines 3b—3b of FIG. 2.
Figure 5:
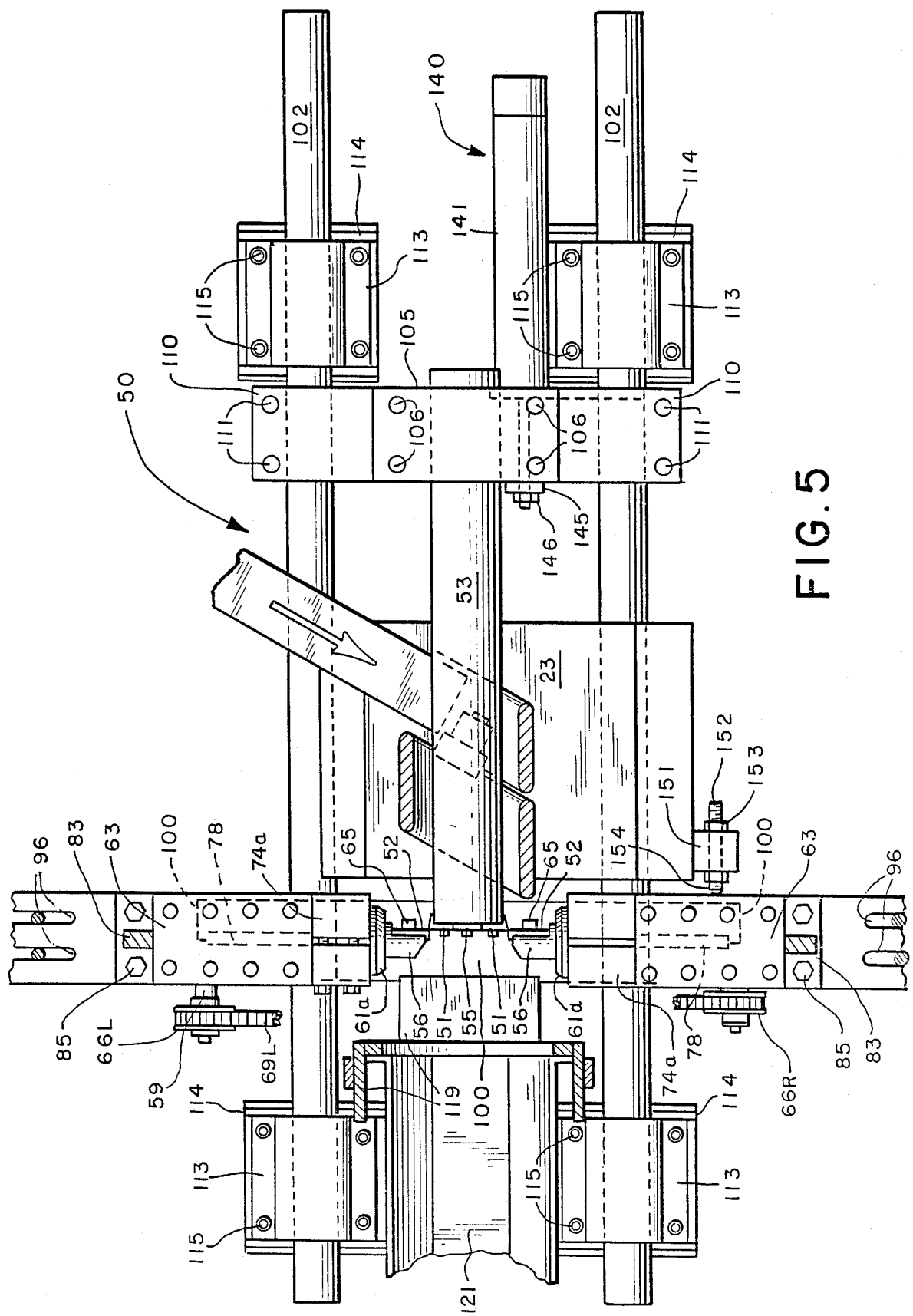
FIG. 5 is a plan view of a preferred embodiment of the present invention.
Figure 6:
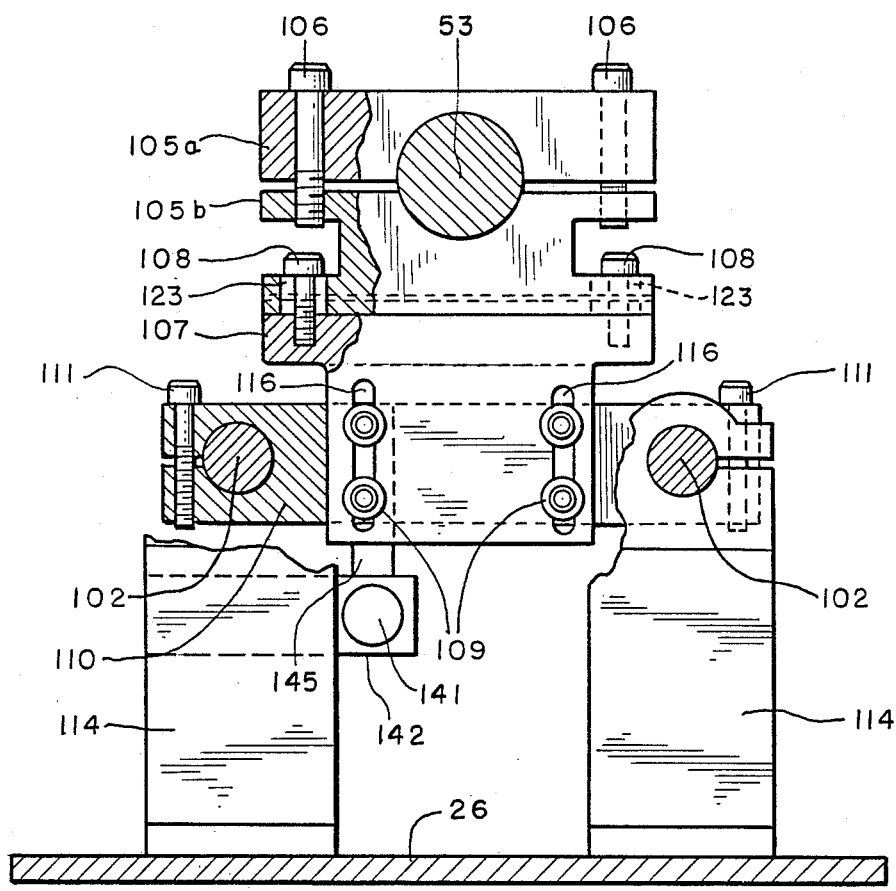
FIG. 6 is a rear elevation view taken along lines 6—6 of FIG. 4, with parts shown in section.
Figure 8:
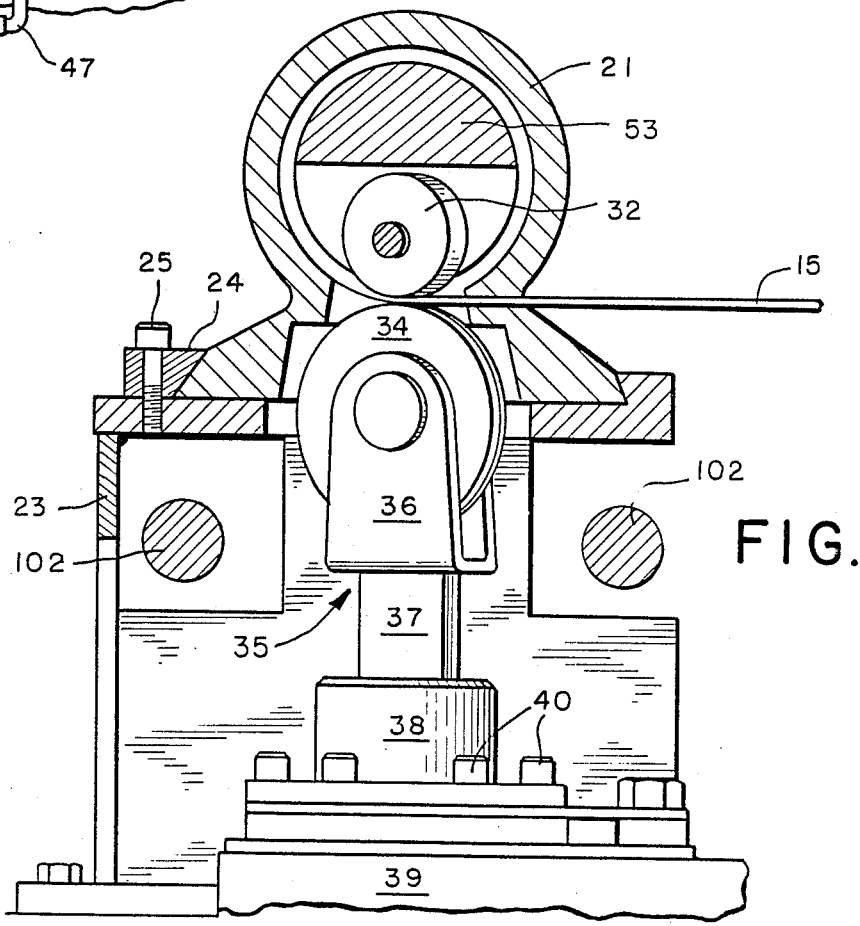
FIG. 8 is a sectional view of part of a spiral pipe forming machine used with a preferred embodiment of the present invention.

It should be noted that the forming head 21 shown in FIG. 1 is designed to produce a spiral pipe having a lockseam on the inner surface of the pipe, whereas the forming head 21, shown in part in FIG. 5 is designed to produce spiral pipe 42 having an external lockseam 43, as shown in FIGS. 3, 3a and 3b. The internal lockseam-type forming head (FIG. 1) is not split like the external lockseam-type forming head 21 (FIG. 5) to accommodate the external lockseam. Further, to produce an internal lockseam pipe, the support roller 32 would be grooved, like the clinching roller 34 shown in FIG. 8, and the clinching roller 34 would have a flat circumferential surface like the support roller 32 shown in FIG. 8. The support roller 32 and clinching roller 34 shown in FIG. 8 are designed to make external lockseam pipe. Also, to produce internal lockseam pipe, means, mounted on the forming head 21, may be required to bend in the outer formed edge of the strip 15 that is used to form the lockseam. It is preferred that the pipe cutting apparatus 50 is used with external lockseam pipe, because the cutting edges of the inner knives 51 should be positioned adjacent to the inner pipe surface. In internal lockseam pipes, the cutting edges of the inner knives 51 must be spaced from the inner pipe surface to allow for clearance of the internal lockseam (and internal corrugations, if any).

It should also be understood that as the spiral pipe 42 is formed, it will move out of the forming head 21 in a spiral manner. That is, the pipe 42 and its leading edge will simultaneously rotate and move forward in the axial direction of the pipe. The pipe 42 will be continuously produced until it reaches its desired length. At that point the pipe cutting apparatus 50 will sever the pipe into a section.

Briefly described, the pipe cutting apparatus 50 has two inner knife blades 51 and two outer knife blades 52 which cooperate to cut the spiral pipe 42 that is formed on the pipe producing machine 10. The inner knives 51 are in a stationary position with respect to the inner pipe surface. The outer knives 52 reciprocate into an out of an overlapping relationship with the inner knives 51. When the outer knives 52 overlap the inner knives 51, they also puncture the pipe 42. The inner and outer knives move axially with the pipe 42 while it is being formed and cut, so that the inner and outer knives cooperate to cut the pipe as it rotates between the inner and outer knives. Because an inner knife and outer knife are located on opposite sides of the pipe 42, the pipe is cut on opposite sides as it rotates, and will be fully cut in one-half of a rotation.

Figure 2:
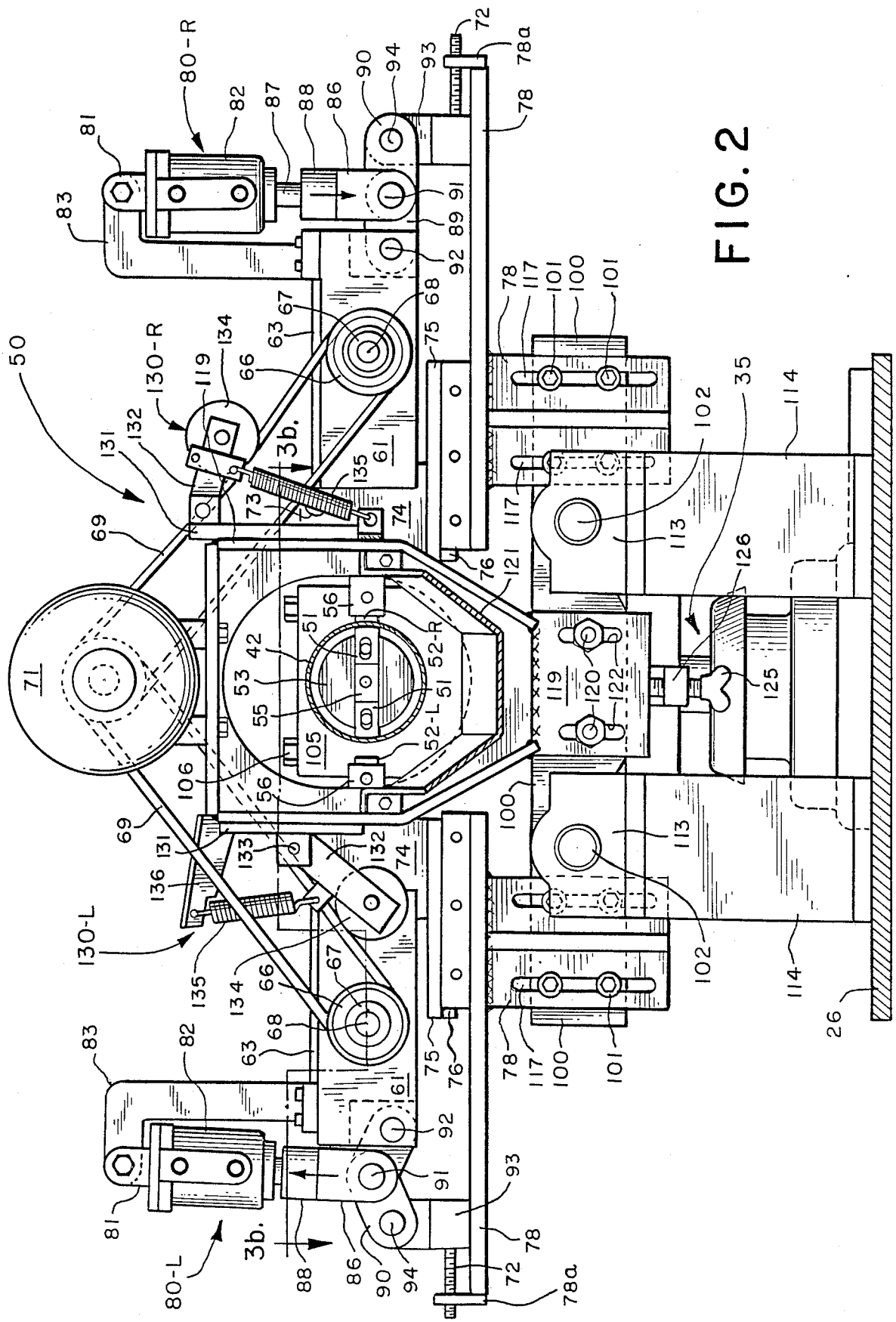
FIG. 2 is a front elevation view of embodiment of the present invention.

Before describing the various components of the pipe cutting apparatus 50 and its operation in greater detail, it should be noted that many identical elements are found in both the right and left sides of this apparatus as viewed from FIG. 2. Thus, some elements described below are present on both sides of the pipe cutting apparatus 50, but are shown on only one side, such as the bushing 62 in FIG. 3. It should be understood that the description of the element shown in a FIG. also applies to the same element which is present, but not shown in a FIG., on the other side of the apparatus. When it is necessary to draw a distinction between an element which is present in both sides of the apparatus 50, the suffix "L" will be added to the reference numeral for the element present on the left side, and the suffix "R" will be added to the reference numeral for the element present on the right side.

Figure 4:
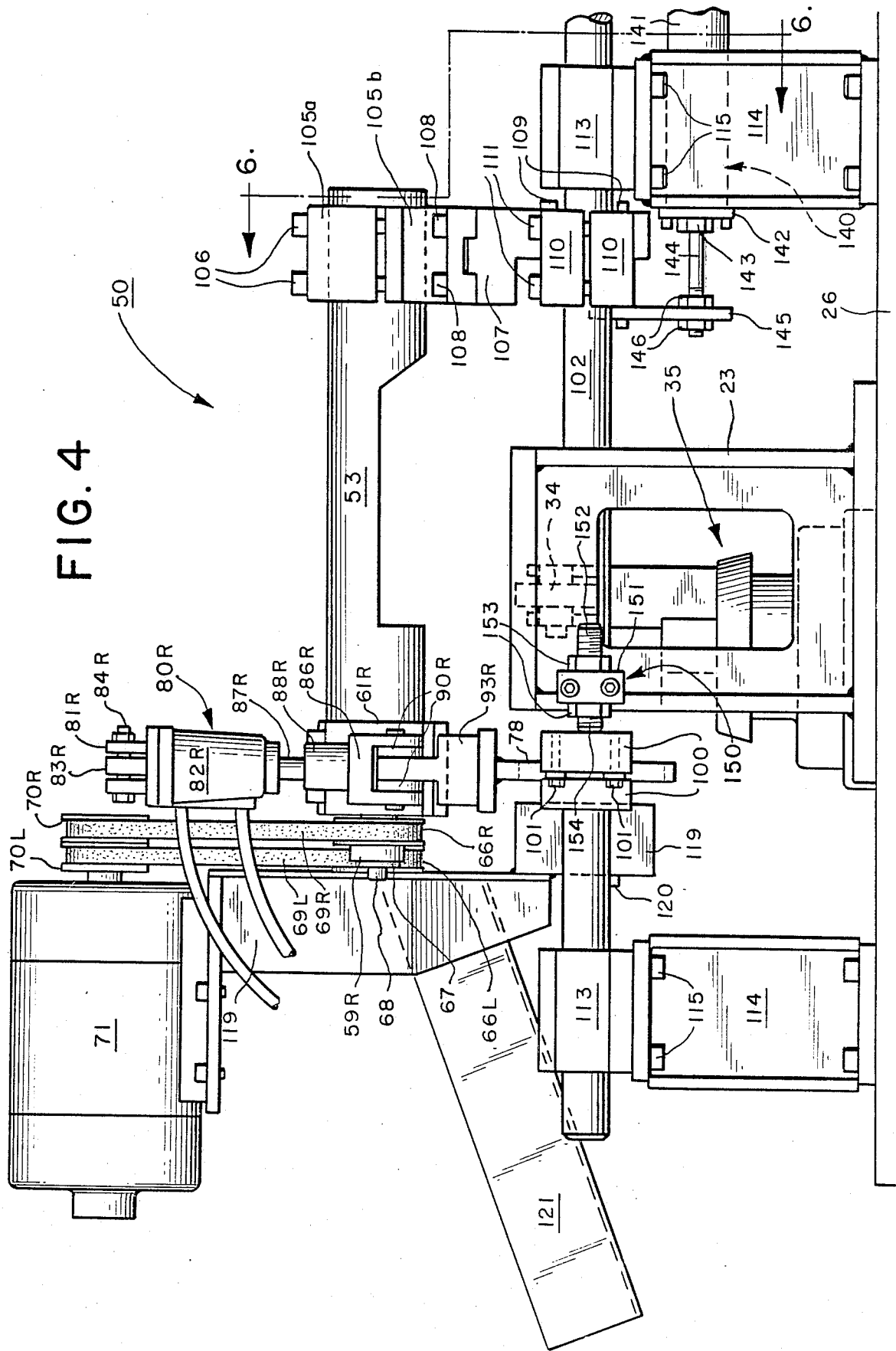
FIG. 4 is a side elevation view of a preferred embodiment of the, present invention.

Referring now to FIGS. 2–4, the inner knives 51 are bolted into the end of a boom 53 which is positioned inside the spiral pipe 42. The bolts 64 pass through oval adjustment slots 54. These slots 54 permit adjustment of the distance between the cutting edges of the inner knives 51 and the inside surface of the pipe 42. It is preferred to have the cutting edges of the inner blades positioned as close to the inside surface of the pipe 42 as possible, but without touching the pipe. The inner knives 51 are adjusted in this manner so as to avoid buckling by the pipe 42 as it is pushed toward the inner knives 51 by the outer knives 52 during the cutting process. As best shown in FIG. 3, the cutting edges of the inner blades 51 have a radius of curvature that is less than or equal to the radius of curvature of the inner pipe surface. The cutting edges of the inner knives are curved in this manner to maximize the contact area between the knife edges and the pipe surface during the cutting process. A spacer block 55 is bolted to the boom 53, and is positioned between the two inner knives 51, which have their cutting edges pointing in opposite directions. The purpose of the spacer block 55 is to prevent the inner knives 51 from being pushed inward by the pipe 42 and outer knives 52 during the cutting process. As best seen in FIGS. 3a and 3b, the cutting edges of the inner knives 51 (and outer knives 52) are cut at a 10 degree angle for 1/16", and then round down to a 45° angle.

Referring now to FIGS. 3, 3a, 3b and 5, each outer knife blade 52 is secured to one end of a plunger 56 by bolts 65. The other end of the plunger 56 is pivotally connected to a rocker 57 with a pin 58. The rocker 57 is mounted on an eccentric shaft 59. Needle cage bearings 60 are inserted between the rocker 57 and the shaft 59. The shaft 59 is rotatably mounted in a housing 61, which also encloses the plunger 56, the rocker 57, the rocker pin 58 and needle cage bearings 60. A bushing 62 is press fit into a cylindrical opening of the housing 61, and secured to that part of the housing 61 with two set screws 124 in the central recessed portion of the bushing. The plunger 56 is adapted to slide back and forth through the bushing 62. Both the plunger 56 and bushing 62 are made of heat treated steel. Grease is also put in the central, recessed cylindrical portion of the plunger 56. A cover 63 is placed over the top opening of the housing 61, and held in place by screws. The cover 63 holds down a gasket which seals the opening to the housing 61, because the housing cavity is partly filled with oil.

As shown in FIG. 5, one end of the shaft 59 extends outside of the housing 61. A lower pulley 66 is placed over that end of each shaft 59, and held in place by a washer 67 and allen bolt 68. Each lower pulley 66 is rotationally driven by a belt 69 which is also wrapped around an upper pulley 70. Both upper pulleys 70 are connected to the shaft of a ¼ HP, DC motor 71. The two upper pulleys 70 are identical Browning pulleys, and the two lower pulleys 66 are identical Browning pulleys. The two lower pulleys 66, however, are connected to their respective shafts 59 differently. Specifically, the lower, right pulley 66-R has its neck portion 66-N positioned away from the right housing 61-R as shown in FIG. 3a, and the central opening for the right pulley 66-R is widened for a short distance to allow the right pulley 66-R to be positioned closer to the housing 61-R. The lower, left pulley 66-L has its neck portion 66-N positioned between the left belt 69-L and the left housing 61-L, as shown in FIG. 3b. This lower pulley arrangement permits the two belts 69 to be offset from one another so that they can be driven by one centrally located motor 71. The upper pulleys 70 are mounted adjacent each other on the motor shaft so that the right, upper pulley 70-R is in the same vertical plane as the right, lower pulley 66-R and the right belt 69-R, and the left, upper pulley 70-L is in the same vertical plane as the left, lower pulley 66-L and the left belt 69-L. The upper, right pulley 70-R is attached to the upper, left pulley 70-L by four equally spaced threaded bolts (not shown). The lower pulleys 66 and upper pulleys 70 have detents, and the belts 69 have ribs that fit into the detents, so that the belts do not slip on the pulleys.

When energized, the motor 71 runs at approximately 3450 RPM, and rotationally drives the upper pulleys 70, which drive the belts 69. The belts 69 rotationally drive the lower pulleys 66, which turn the eccentric shafts 59. The rotation of the eccentric shafts 59 impart an eccentric motion to the rockers 57, which cause the plungers 56 to alternatingly move in and out of the bushings 62. As a result, the outer knives 52 alternatingly move toward and away from their respective, opposed inner knives 51. In other words, each outer knife 52 reciprocates, at a high speed, in a direction toward its respective, opposed inner knife 51. The eccentricity of the shaft 59 is selected to provide a stroke for the outer knife blade, whichever stroke (e.g. 2-4 mm) provides the best cutting results.

Ordinarily, the motor 71 will be continuously running, so that the outer knives 52 will be continuously reciprocating. Thus, during the pipe forming process, the reciprocating outer knives 52 must be maintained in an idling position, where they will not interfere the spirally moving pipe 42. Conversely, when it is time to cut the pipe, the outer blades 52 must be moved to a cutting position, where their cutting edges reciprocate into and out of an overlapping relationship with the cutting edges of the inner knives 51. In order to achieve this result, the housing 61 is mounted in a slide bracket 74. The slide bracket 74 is connected to a piece of flat stock 75 and the sliding element of a THK roller table 76 by a plurality of recessed, threaded bolts 77. The fixed, lower portion of the THK roller table 76 is fastened to a support bracket 78 at the bottom of the roller table 76 and on both sides by a plurality of allen bolts. The roller table 76 can be adjusted, from side-to-side, within the support bracket 78 by the allen bolts. The housing 61 and all its constituent components can slide back and forth along the roller table 76, toward and away from the inner knives 51 and the pipe 42.

The outer blades 52 are moved into and out of their cutting positions by the pneumatic cylinder assemblies 80. A top clevis 81 is bolted to the top of the cylinder body 82. A cylinder bracket 83 is pivotally connected to the top clevis 81 with a nut and bolt 84. The cylinder bracket 83 is fixed to the housing 61 by a plurality of allen bolts 85. A lower clevis 86 is attached to the piston rod 87 which extends downwardly from the cylinder body 82. A spacer 88 is fitted around the piston rod 87, and is positioned on top of the lower clevis 86. The spacer 88 thereby limits the extent of upward travel or retraction of the piston rod 87 and lower clevis 86. One end of an inner link 89 and two outer links 90 are pivotally connected to the lower clevis 86 by a pin 91. The other end of the inner link 89 fits inside an arch-shaped cavity of the housing 61, and is pivotally connected to a pin 92 which ends between the two walls forming the arch-shaped cavity. The other end of the outer links 90 is pivotally connected to a support member 93 by a pin 94. The support member 93 is secured to the support bracket 78 by two bolts 95. Each bolt 95 passes through an oval slot 96. An allen bolt 72 is attached to the support member 93, and threaded through a flange 78a that is part of the support bracket 78.

During the pipe forming process, the piston rods 87 of both pneumatic cylinder assemblies 80 will be retracted in the manner shown in FIG. 2 for the left pneumatic cylinder assembly 80-L. The housings 61 and their connected components will then be maintained in a position where the outer knives 52 will not contact the pipe 42 or overlap with the inner knives 51, even though the outer knives 52 are reciprocating towards the inner knives 51. As a result, the pipe can be continuously formed to its desired length without contacting either the inner knives 51 or outer knives 52. When the pipe is cut, the pneumatic cylinders 80 push their piston rods 87 downwardly to the position shown in FIGS. 2 and 3 for the right pneumatic cylinder assembly 80-R. The housing 61 and its connected components will then be moved to a cutting position. In this cutting position, the outer knives 52 will reciprocate between a position where they are clear of the pipe 42, as shown in FIGS. 2 and 3, and a position where their cutting edges will overlap the cutting edges of the inner knives 51, as shown in FIGS. 3a and 3b, and thus puncture the pipe 42.

As shown in FIGS. 2 and 3, in the cutting position, the piston rod 87 is fully extended so that the inner and outer links 89 and 90 are locked into horizontal alignment. In this position, the links 89, 90 provide support to counteract the forces exerted on the outer knives 52 during the cutting process. The oval slots 96 and allen bolts 72 permit the cutting position, and hence the amount of overlap permitted between the inner and outer knives, to be adjusted. The pneumatic cylinder assembly 80 and housing 61 and its associated components can be slid along the oval slots 96 by turning the allen bolt 72, and locked into the desired position by the bolts 95. It is preferred that the maximum amount of overlap between the outer and inner knives is minimized (e.g., $\frac{1}{8}''-1/16''$), which leaves a smoother cut pipe edge.

The belts 69 must retain a constant tension to drive the lower pulleys 66 as the lower pulleys are moved back and forth towards the pipe 42 by the pneumatic cylinder assemblies 80. Belt tensioners 130 are provided for this purpose. Each belt tensioner assembly 130 has a mounting bracket 131 which is bolted to opposite sides of the motor bracket 119. The bolts pass through oval slots in the mounting bracket 131, which permit vertical adjustment of the belt tensioner assembly. An arm 132 is pivotally connected to the mounting bracket 131 at one end by an integral shaft 133. A second integral shaft at the other end of the arm 132 carries an idler wheel 134, which rides on the loose side of its respective belt 69. A spring 135 is connected between the arm 132 and mounting bracket 131, and pulls the idler wheel 134 against the belt 69, thereby tensioning it. The motor 71 turns clockwise, as seen from FIG. 2, which causes the loose side of the right belt 69-R to be on the top side and the loose side of the left belt 69-L to be on the bottom side, as the belts are shown in FIG. 2. For this reason, the right arm 132-R is pivotally connected to the top of the right mounting bracket 131-R, and the left arm 132-L is pivotally connected to the bottom of the left mounting bracket 131-L. Further, an extension bracket 136 is required to connect the left spring 135-L to the left arm 132-L and the left mounting bracket 131-L.

When in the cutting position, the reciprocating outer knives 52 will cooperate with the inner knives 51 to cut the complete circumference of the pipe 42 as the spirally produced pipe rotates between the inner and outer knives. However, because the spirally formed pipe 42 moves axially as it rotates, the inner and outer knives must also move axially with the pipe 42 during the cutting process. For this reason, the support brackets 78, on which the outer knives 52 and associated components are mounted, are attached to a connecting bar 100 by a plurality of allen bolts 101. The connecting bar 100 is mounted on two shafts 102 of a THK Slide Bearing SC 25. The guide shafts 102 are oriented to slide in the axial direction of the pipe 42, and pass through cylindrical openings in the connecting bar 100. Two allen bolts 103 squeeze together the sides of the connecting bar openings around the shafts 102, so that the connecting bar 100 is fixed to and moves with the shafts 102. Accordingly, the outer knives 52 and their connected components slide with the guide shafts 102 in the axial direction of the pipe 42.

The motor 71 is also adapted to move with the guide shafts 102. The motor 71 is bolted on to a bracket 119, which is attached to the bolt connecting bar 100 with allen bolts 120. Oval slots 121 and a vertical adjustment bolt 125 allow the height of the motor 71 to be adjusted. The vertical adjustment bolt 125 is threaded through a mounting bracket 126, which is bolted to the underside of the connecting bar 100. A slide 121 is attached to the motor bracket 119, and thus moves axially with the guide shafts 102. The slide 121 is intended to catch the cut pipe sections and direct them to an area where they will not interfere with the operation of the cutting apparatus 50.

The inner knives 51 are also connected by several components to the guide shafts 102, so that they will move in unison with the guide shafts 102 and outer knives 52 in the axial direction of the pipe 42. Specifically, the inner knives 51 are attached to one end of the boom 53 which passes into the pipe 42. The other end of the boom 53 extends out of the pipe 42, and is connected to a boom holder 105. The boom holder 105 has an upper section 105a and a lower section 105b. Each section has a semi-cylindrical cavity which abuts the boom 53. The upper section 105a and the lower section 105b are clamped to each other, around the boom 53, by a plurality of allen bolts 106. The lower section 105b is mounted on an attachment block 107, and fixed thereto by allen bolts 108. The attachment block 107 passes between the shafts 102, and is secured to a shaft connector 110 by allen bolts 109. The shaft connector 110 has two cylindrical openings through which the guide shafts 102 pass. A plurality of allen bolts 111 squeeze together the sides of these openings around the shafts 102, so that the shaft connector 110 is fixed to and slides axially with the guide shafts 102.

The shafts 102 pass through openings cut in the forming head base 23, and slide through the bearing housings 113 of the THK Slide Bearing SC 25 assemblies. There are four such bearing housings 113, each of which is attached to the top of a mounting leg 114 by allen bolts 115. The four mounting legs 114 are identical in structure, and are provided to support the cutting apparatus 50 at the correct height with respect to the forming head base 23. The mounting legs 114 are attached to a base plate 26. The base plate 26 is bolted to the pipe forming machine 10 when the pipe cutting apparatus 50 is to be used. The base plate 26 can be the same base plate shown in U.S. Pat. No. 4,706,481, with additional holes drilled to accommodate the mounting legs 114 of the present cutting apparatus 50. That way, the cutting apparatus 50 and the slitter type apparatus disclosed in U.S. Pat. No. 4,706,481 can be used with the same pipe forming machine 10.

When the outer knives 52 puncture the pipe 42 and overlap their respective inner knives 51, the guide shaft system allows the axially moving pipe to push the overlapping knives in the axial direction of the pipe, so that the inner and outer knives, and their connected components, move in unison, axially with the pipe. For this reason, it is presently preferred that the outer knives 52 are reciprocated 180 degrees out of phase. That is, when one outer knife is fully extended toward its opposed inner knife, the other outer knife is fully retracted away from its opposed outer knife. Thus, when one outer knife is out of contact with the pipe 42, the other outer knife is in contact with the pipe, so that the sliding elements of the pipe cutting apparatus are adapted to be moved axially by the pipe. This type of phase control is easily obtained by rotating the right eccentric shaft 59-R to be 180 degrees out of phase from the left eccentric shaft 59-L, before the belts 69 are tensioned.

An axial motion cylinder assembly 140 is provided to assist the axial movement of the cutting elements of the pipe cutting apparatus 50. This assembly includes a FESTO pneumatic cylinder 141 which is supported by a piece of flat stock 142, and held in place by a nut 143. The flat stock 142 is fixed to a rear mounting leg 114 by a plurality of bolts. The ram 144 of the cylinder 141 is secured to a second piece of flat stock 145 by a pair of nuts 146. The second piece of flat stock 146 is secured to the central, inner portion of the shaft connector 110 by a plurality of bolts. When air is supplied to the cylinder 141 in one direction, the ram 144 extends out of the cylinder 141, and pushes the shaft connector 110, and all parts attached to it such as the inner and outer knives, in the axial direction of the pipe. When the air to the cylinder 141 is reversed, the ram 144 retracts into the cylinder and pulls the knives 51 and 52. via the shaft connector 110 and associated parts. back to their begin-cut position. The air supplied to the cylinder 140 is adjusted to assure that the knives 51, 52 move at the same axial speed as the pipe so that a clean, rectangular cut is obtained.

A stop/shock absorber mechanism 150 is provided to fix the starting or begin-cut position of the inner and outer knives. This mechanism comprises a mounting block 151 which is bolted to the forming head base 23. A commercially-available, hydraulically-dampened plunger 152 extends through the mounting block 151 in the axial direction of the pipe. The plunger 152 is held in place by nuts 153, which mate with threaded portions of the plunger 152. A plaster tip 154 is mounted on the ram (not shown) of the plunger 152. The stop/shock absorber assembly 150 serves two functions. First, it serves as a stop, which sets the begin-cut position of the pipe cutting apparatus 50. When the axial motion ram 144 fully retracts, the connecting bar 100 comes to rest against the plastic tip 154 of the fully retracted plunger 152, as shown in FIG. 4. Thus, the nuts 153 and threaded portions of the plunger 152 can be adjusted to set the begin-cut position. Second, when the ram 144 extends and pushes the connecting bar 100 away from the stop mechanism 150, a spring (not shown) in the plunger 152 pushes the ram and plastic tip 154 out of the plunger 152 until the ram reaches its end of travel. When the connecting bar 100 returns to the begin-cut position, it will push the plastic tip 154 and ram into the plunger 152, until the connecting bar 100 returns to the start position. While the ram is pushed back into the plunger 152, it provides a hydraulic cushion or shock-absorber effect on the connecting bar 100 and its connected components.

In cutting the pipe 42, it is important that the cutting edges of the inner and outer knives are properly aligned with respect to each other and to the pipe. As shown in FIGS. 2 and 3, the cutting edges of both the inner and outer knives should be perpendicular to the horizontal plane running through the centerline of the pipe, and the mid-point of the cutting edges of the knives should be on that same plane. The cutting edges of the inner knife blades 51 should also be positioned equal distances to the inner surface of the pipe 42, and as close as possible to the inner pipe surface. The cutting edges of each outer knife 52 should be positioned opposite the cutting edge of an inner knife 51. The cutting edges of opposed inner and outer knives should be in parallel vertical planes which are displaced slightly in the axial direction of the pipe, so that the outer blade 52 can overlap the inner blade 51 without touching it. The axial separation between the overlapping inner and outer blades, however, should be minimized. If this separation is too large, the cut edge of the pipe will be fold inwardly.

In order to achieve the proper alignment among the inner knives 51, the outer knives 52 and the pipe 42, a variety of adjustments are available on the cutting apparatus 50. Some such adjustments are discussed above. The remaining adjustments will be discussed here.

Turning first to the inner knives 51, the height of the inner knives 51 can be adjusted with the vertical adjustment slots 116 provided on the attachment block 107. Specifically, the adjustment block 107 can be secured to the shaft connector 110 by the allen bolts 109 anywhere along the vertical adjustment slots 116. In this manner, the height of the boom 53 and the inner knives 51 mounted to it, is adjusted. The boom 53 can also be rotated to any angular position by loosing bolts 106 on the boom holder 105, and then held in that angular position by tightening the bolts 106. In this way, the angular position of the inner knives 51 can be adjusted. The angular position and height adjustments of the inner knives 51 permit the cutting edges of the inner knives to be positioned perpendicular to the horizontal plane running through the centerline of the pipe, and the mid-point of these cutting edges to be on that same plane. The boom 53 can also be slid through the boom holder 105 to any extent while the bolts 106 are loosened. This permits adjustment of the axial separation between the outer and inner knives when they overlap. Oval slots 123 are also provided in the lower section 105b of the boom holder where the allen bolts 108 secure the lower section 105b to the adjustment block 107. These slots allow the boom 53 to be adjusted along a horizontal plane, so that the boom 53 can be centered in the pipe 42 in the horizontal direction as viewed from FIGS. 2 and 3. This adjustment thus permits the cutting edges of the two inner knives 51 to be positioned equidistant from the pipe's inner surface.

A plurality of adjustments are also available for the outer knives 52. The height of the outer knives 52 can be adjusted with the vertical adjustment slots 117 provided on the support brackets 78. Thus, each support bracket 78 can be secured to the connecting bar 100 by the allen bolts 101 anywhere along the vertical adjustment slots 117. In this manner, the height of each outer knife 52 can be adjusted. Each housing 61 and its outer knife 52 can also be rotated to any angular position in the following manner. The housing 61 has a cylindrical portion 61a that slides into a cylindrical opening in the slide bracket 74. The outer knife 52 can thus be held at the desired angular orientation by two bolts 73 which squeeze together the split upper portion 74a of the slide bracket 74 around the cylindrical portion 61a of the housing 61. These angular and height position adjustments of the outer knives 52 permit the cutting edges of the outer knives to be positioned perpendicular to the horizontal plane running through the centerline of the pipe, and the mid-point of these cutting edges to be on that same plane. Three set screws 118, shown in phantom in FIG. 3, are provided to adjust both the horizontal and vertical pitch of each outer knife 52. The set screws 118 are inserted through the backside of the connecting bar 100, as shown in FIG. 3, and abut the support bracket 78. Thus, by variously turning these set screws 118, the angular position of the outer knife 52 can be further adjusted, and the cutting edge of the outer knife 52 can be adjusted to be in a vertical plane parallel to the vertical plane of the cutting edge of its opposed inner knife 51.

Following is additional information about the materials presently used by applicant for some of the elements discussed above. The needle cage bearings 60 are presently obtained from IKO Bearings, Arlington Heights, Ill. (part no. 253224). The THK slide bearing units 102, 113 are obtained from THK America, Inc., Elk Grove Village, Ill. (part no. SC 25). FESTO pneumatic cylinders (type no. 9703; ADV-32-25) are used for the pneumatic cylinders 82. The motor 71 is a BALDOR Industrial Motor (Cat. No. AP 7422). The boom 53 has a section carved out of the bottom central area of its otherwise cylindrical shape to provide clearance for the support roller 32. The inner and outer knife blades 51, 52 are made of toolsteel 60°–62° HRC. The boom 53 is made of prehardened steel. The plungers 56 are made of toolsteel 54°–56° HRC. The rockers 57, rocker pins 58, and pivot pins 90, 91 and 92 are toolsteel 58° HRC. The eccentric shafts 59 are made of toolsteel 56°–58° HRC. The bushings 62 are made of toolsteel 58°–60° HRC. The following parts are made of CRS: cover 63, washer 67, spacer 88 slide bracket 78, connecting bar 100, attachment block 107, mounting legs 114, and the elements of the belt tensioning assembly 130.

To operate the cutting apparatus 50, an electrical encoder 27 is coupled to the lower drive roller 17 of the pipe producing machine 10 by a pulley belt 28. The encoder 27 is adapted to generate pulses corresponding to the number of rotations of the lower drive roller 17. These pulses are transmitted over a cable 29 to a control box 44. The control box 44 is programmed to check for a first pulse count corresponding to the desired length of the pipe, and a second pulse count corresponding to the amount of axial travel of the pipe required for the pipe to be completely cut by the cutting apparatus 50. Counters 45 and 46 are included in the control box. These counters can be incremented or decremented, one pulse at a time, to set the first pulse count and second pulse count. The first pulse count (i.e., pipe length) is set with the first counter 45, and the second pulse count (i.e., cut length) is set with the second counter 46. The control box 44 sends a pneumatic signal to the pneumatic cylinders 82 over line 47 in response to the first and second pulse counts. The control box 44 also has a counter reset switch 48 and an on/off switch 49. When the reset switch 48 is depressed, the counters 45 and 46 are reset to zero.

The cutting apparatus 50 operates in conjunction with the pipe producing machine 10 in the following manner. The spiral pipe forming process is initiated with the pipe forming machine 10 in a known way. When the leading edge of the pipe begins to leave the forming head 21, the pipe producing machine is temporarily halted, and the pipe cutting apparatus 50 is energized by turning on switch 49. The motor 71 is energized to run continuously, so that the outer knives 52 continuously reciprocate towards and away from their opposed inner knives 51. The pneumatic cylinder assemblies 80 are initialized to be in their retracted positions, so that the reciprocating outer knives 52 do not overlap the inner knives 51. The first counter 45 is reset to zero, and then set for the first pulse count (i.e., pipe length). The second counter 46 is reset to zero, and then set for the second pulse count (i.e., cut length). Air is sent to the axial motion cylinder 140 to fully retract ram 144, so that the inner and outer knives are in the begin-cut position.

The pipe forming machine 10 is then permitted to resume operation. The pipe 42 is continuously formed in a spiral manner. The newly formed pipe moves away from the forming head 21 in a helical manner, so that it moves axially and rotates between the inner knives 51 and the reciprocating, outer knives 52. The encoder 27 generates a train of pulses that correspond to the length of pipe being formed. When the pipe reaches a length measured by the first pulse count, the control box 44 sends a first pneumatic pulse signal, via line 47, to both pneumatic cylinder assemblies 80. The pneumatic piston rods 87 are thereby energized and pushed downward to their locked position, as shown for the right cylinder 82-R in FIG. 3. Through the combination of elements described above, the pneumatic cylinder assemblies 80 move the reciprocating outer knives 52 to a cutting position, where their cutting edges reciprocate into and out of an overlapping relationship with the cutting edges of the inner knives 51. As the outer knives 52 move into the overlapping relationship with the inner knives 51, they puncture the pipe 42. When the first pulse count is detected, the control box 44 also sends a signal which reverses the direction of air supplied to the axial motion cylinder 141, so that the ram 144 pushes the shaft connector 110, and cutting knives 51, 52, axially with the pipe.

Through the combination of elements described above, the guide shafts 102 allow the inner and outer knives to move in the axial direction of the pipe under the forces provided by the pipe pushing on the overlapping knives and the extension of the axial motion ram 144. Thus, the inner knives 51 and reciprocating outer knives 52 cooperate to cut the complete circumference of the pipe as the pipe moves axially and rotates between the inner and outer knives. The left inner and outer knives 51-L, 52-L are displaced 180 degrees around the pipe from the right inner and outer knives 51-R, 52-R. As a result, the pipe is cut from two sides as it rotates, and will be completely cut, in rectangular fashion, in one-half of its rotation. The second pulse count programmed into the control box 44 will be the number of pulses corresponding to the axial travel corresponding to slightly more than one-half pipe rotation. It is generally preferred to have a little overlap in the cut to assure that the pipe section is completely severed.

When the second pulse count is detected by the control box 44, it sends a second pneumatic pulse signal to the pneumatic cylinder assemblies 80 over line 47. This second signal indicates that the cutting process is completed, and thus operates the pneumatic cylinders 82 to fully retract their piston rds 87. The reciprocating outer knives 52 are then moved to their idling positions, as shown for the left outer knife 52-L in FIG. 2, where their cutting edges do not overlap the cutting edges of the inner knives 51. When the second pulse count is generated, the control box 44 also sends a second signal to the axial motion cylinder 141. This second signal reverses again the direction of air supplied to the cylinder 141, so that the ram 144 pulls the cutting assembly 50 mounted on the shafts 102 back to its starting position. The counters 45 and 46 are reset to zero, and the cutting process is repeated.

It will usually be necessary to cut the first few pieces of pipe on a trial basis in order to determine the precise pulse counts corresponding to the desired pipe length and the travel required for the cut. In the embodiment just described, the actual pipe length is measured by the sum of the first and second pulse counts, since pipe continues to be formed while a preceding section is cut. The cut length is usually predetermined. Thus, the first pulse count is determined by subtracting the second pulse count from the pulse count required to obtain the desired pipe length. Once the first and second pulse counts are finalized, the pipe forming machine 10 is continuously run, and the cutting apparatus 50 automatically and continuously cuts the pipe into sections of the same length. In order to assure that each pipe section is cut to the same length, the pipe forming machine 10 should be run at a constant speed for the cutting process. If it is not, the pipe will travel at varying speeds, and hence distances, in the time it takes the outer knives 52 to move from their idling positions to their cutting positions.

In other embodiment of the invention it may be preferred that the two outer knives 52 reciprocate in unison, so that they each contact the pipe 42 and overlap their respective opposed inner knife 51 at the same time. This mode may be preferred so that the forces exerted on the boom 53 by the outer knives 52 counteract each other when cutting small diameter pipe (e.g., 2 inches or less), if the smaller boom is less rigid. The axial motion cylinder assembly 140 should then be adjusted to assure that the cutting elements of the pipe cutting apparatus continue to move at the same axial speed of the pipe when the outer blades are not in contact with the pipe, so that a clean, rectangular cut is obtained. When the present invention is used to cut larger diameter pipes, a larger diameter boom may be acceptable. A larger boom will necessitate different upper and lower sections of the boom holder 105 which have larger semi-cylindrical cavities to hold the boom.

Further enhancements to the embodiment described above of the pipe cutting apparatus 50 are presently contemplated. First, the eccentric shafts 59 may be lengthened to extend out of both sides of the housing. Counterweights may then be placed on the ends of the shafts 59 which do not carry the pulleys 66. The inner and outer knives 51 and 52 may be made of carbide or other harder material. The cutting control scheme may also be modified in the following manner. The cycle begins by resetting the counters 45, 46 and cutting the pipe. The first pulse count measures the cut length. After the first pulse count, the outer blades 52 return to their idling position, but pipe production continues. The second pulse count continues to count pulses until the desired pipe length is reached. At that point, a cycle ends, and a new cycle begins by cutting the preceding section at its desired length. In this control scheme, the pipe length is measured independently of the cut length.

Still another control scheme can be implemented using three counters. In such a scheme, a first counter would count the pulses from cut to cut. A second counter would count the pulses corresponding to the cut length. A third counter would count pulses from the begin-cut to a slow-down distance from the next cut. This control scheme is contemplated for production of long pipes. It is preferred that the pipe not move too fast during the cutting process. However, it is further preferred that during production of long pipe, the pipe forming proceeds at a faster speed prior to cutting. The three counter control scheme would allow the pipe to be formed at a higher speed until a slow-down point prior to the initiation of the cutting process, and still conduct the cutting process at a lower speed.

It should be understood that various changes and modifications to the preferred embodiment described above will be apparent to those skilled in the art. It is intended that the foregoing description be regarded as illustrative rather than limiting, and that it is the following claims, including all equivalents thereof, which are intended to define the scope of the invention.

I claim:

1. An apparatus for cutting pipe which is spirally formed from a flat strip, whereby the pipe moves in an axial direction and rotates while it is being formed, comprising:
   first knife means to be positioned inside the pipe;
   second knife means to be positioned outside the pipe;
   means for reciprocating the second knife means into and out of an overlapping relationship with the first knife means; and
   guide means for allowing the first and second knife means to move in the axial direction of the pipe, so that during a cutting operation the second knife means will reciprocate and overlap the first knife means as the pipe moves axially and rotates between the first and second knife means.

2. An apparatus for cutting pipe which is spirally formed from a flat strip, whereby the pipe moves in an axial direction and rotates while it is being formed, comprising:
   first knife means to be positioned inside the pipe;
   second knife means to be positioned outside the pipe;
   means for reciprocating the second knife means in a direction toward the first knife means;
   means for moving the second knife means to a cutting position where it will reciprocate into and out of an overlapping relationship with the first knife means; and
   guide means for allowing the first and second knife means to move in the axial direction of the pipe when the second knife means is in the cutting position, so that during a cutting operation the second knife means will reciprocate and overlap the first knife means or the pipe moves axially and rotates between the first and second knife means.

3. The apparatus of claim 2 further comprising means for adjusting the position of the first knife means relative to the position of the second knife means.

4. The apparatus of claim 2 further comprising means for adjusting the position of the second knife means relative to the position of the first knife means.

5. The apparatus of claim 3 wherein the adjusting means includes means for adjusting the height of the first knife means, means for adjusting the angular position of the first knife means, and/or means for adjusting the distance between the first knife means and the inside surface of the pipe.

6. The apparatus of claim 4 wherein the adjusting means includes means for adjusting the height of the second knife means, means for adjusting the pitch of the second knife means, and/or means for adjusting the cutting position of the second knife means.

7. For use with a machine for producing spiral seamed hollow pipe from a metal strip including drive means for feeding the strip through the machine, means for forming the strip into a spiral cylinder so that the outer edges of the strip are adjacent each other, and means for joining the adjacent edges to produce a spiral seamed pipe, whereby the pipe moves in an axial direction and rotates while it is being formed, a pipe cutting apparatus comprising:
   first knife means to be positioned inside the pipe;
   second knife means to be positioned outside the pipe;
   means for reciprocating the second knife means in a direction toward the first knife means;
   means for moving the second knife means to a cutting position where it will reciprocate into and out of an overlapping relationship with the first knife means; and
   guide means for allowing the first and second knife means to move in the axial direction of the pipe when the second knife means is in the cutting position, so that during a cutting operation the second knife means will reciprocate and overlap the first knife means as the pipe moves axially and rotates between the first and second knife means.

8. The apparatus of claim 7 further comprising means for controlling the moving means to move the second knife means to the cutting position in response to a signal corresponding to a predetermined length of pipe, and to move the second knife means out of the that the pipe has been completely cut.

9. The apparatus of claim 7 further comprising means for adjusting the height of the first knife means, means for adjusting the angular position of the first knife means, and means for adjusting the distance between the first knife means and the inside surface of the pipe.

10. The apparatus of claim 7 further comprising means for adjusting the height of the second knife means, means for adjusting the pitch of the second knife means, and means for adjusting the cutting position of the second knife means.

11. An apparatus for cutting pipe which is spirally formed from a flat strip, whereby the pipe moves in an axial direction and rotates while it is being formed, comprising:
   first and second knife means to be positioned inside the pipe;
   third and fourth knife means to be positioned outside the pipe, the third knife means positioned opposite the first knife means and the fourth knife means positioned opposite the second knife means;
   first reciprocating means for reciprocating the third knife means in a direction toward the first knife means;
   second reciprocating means for reciprocating the fourth knife means in a direction toward the second knife means;
   first moving means for moving the third knife means to a first cutting position where it will reciprocate into and out of an overlapping relationship with the first knife means;
   second moving means for moving the fourth knife means to a second cutting position where it will reciprocate into and out of an overlapping relationship with the second knife means; and
   guide means for allowing the first, second, third and fourth knife means to move in the axial direction of the pipe when the third and fourth knife means are in the first and second cutting positions, whereby the first and third knife means will cooperate to cut the pipe when the third knife means reciprocates and overlaps the first knife means and the second and fourth knife means will cooperate to cut the pipe when the fourth knife means reciprocates and overlaps the second knife means, as the pipe moves axially and rotates between the first and third knife means and between the second and fourth knife means.

12. The apparatus of claim 11 including means for controlling the first and second reciprocating means so that the third and fourth knife means are reciprocated 180 degrees out of phase.

13. An apparatus for cutting pipe which is spirally formed from a flat strip, whereby the pipe moves in an axial direction and rotates while it is being formed, comprising:

first and second knife means mounted on a boom to be positioned inside the pipe, the first and second knife means each having a cutting edge to be positioned close to the inside surface of the pipe and pointing in opposite directions;

third and fourth knife means to be positioned outside the pipe, the third knife means having a cutting edge positioned opposite of the cutting edge of the first knife means, and the fourth knife means having a cutting edge positioned opposite the cutting edge of the second knife means;

first reciprocating means for reciprocating the third knife means in a direction toward the first knife means;

second reciprocating means for reciprocating the fourth knife means in a direction toward the second knife means;

first moving means for moving the third knife means to a first cutting position where its cutting edge will reciprocate into and out of an overlapping relationship with the cutting edge of the first knife means;

second moving means for moving the fourth knife means to a second cutting position where its cutting edge will reciprocate into and out of an overlapping relationship with the cutting edge of the second knife means; and guide means for allowing the first, second, third and fourth knife means to move in the axial direction of the pipe when the third and fourth knife means are in the first and second cutting positions, whereby the first and third knife means will cooperate to cut the pipe when the cutting edge of the third knife means reciprocates and overlaps the cutting edge of the first knife means and the second and fourth knife means will cooperate to cut the pipe when the cutting edge of the fourth knife means reciprocates and overlaps the cutting edge of the second knife means, as the pipe moves axially and rotates between the first and third knife means and between the second and fourth knife means.

14. The apparatus of claim 13 further comprising means for controlling the first and second reciprocating means so that the third and fourth knife means are reciprocated 180 degrees out of phase.

15. The apparatus of claim 13 further comprising means for adjusting the positions of the first and second knife means relative to the positions of the third and fourth knife means.

16. The apparatus of claim 15 wherein the adjusting means includes means for adjusting the height of the first and second knife means, means for adjusting the angular position the first and second knife means, and means for adjusting the distance between the cutting edges of the first and second knife means and the inside surface of the pipe.

17. The apparatus of claim 13 further comprising means for adjusting the positions of the third and fourth knife means relative to the positions of the first and second knife means.

18. The apparatus of claim 17 wherein the adjusting means includes means for adjusting the height of the third and fourth knife means, means for adjusting the pitch of the third and fourth knife means, and means for adjusting the first and second cutting positions.

* * * * *